S. P. KASE.
Rice Cleaner.
No. 30,682.  Patented Nov. 20, 1860.
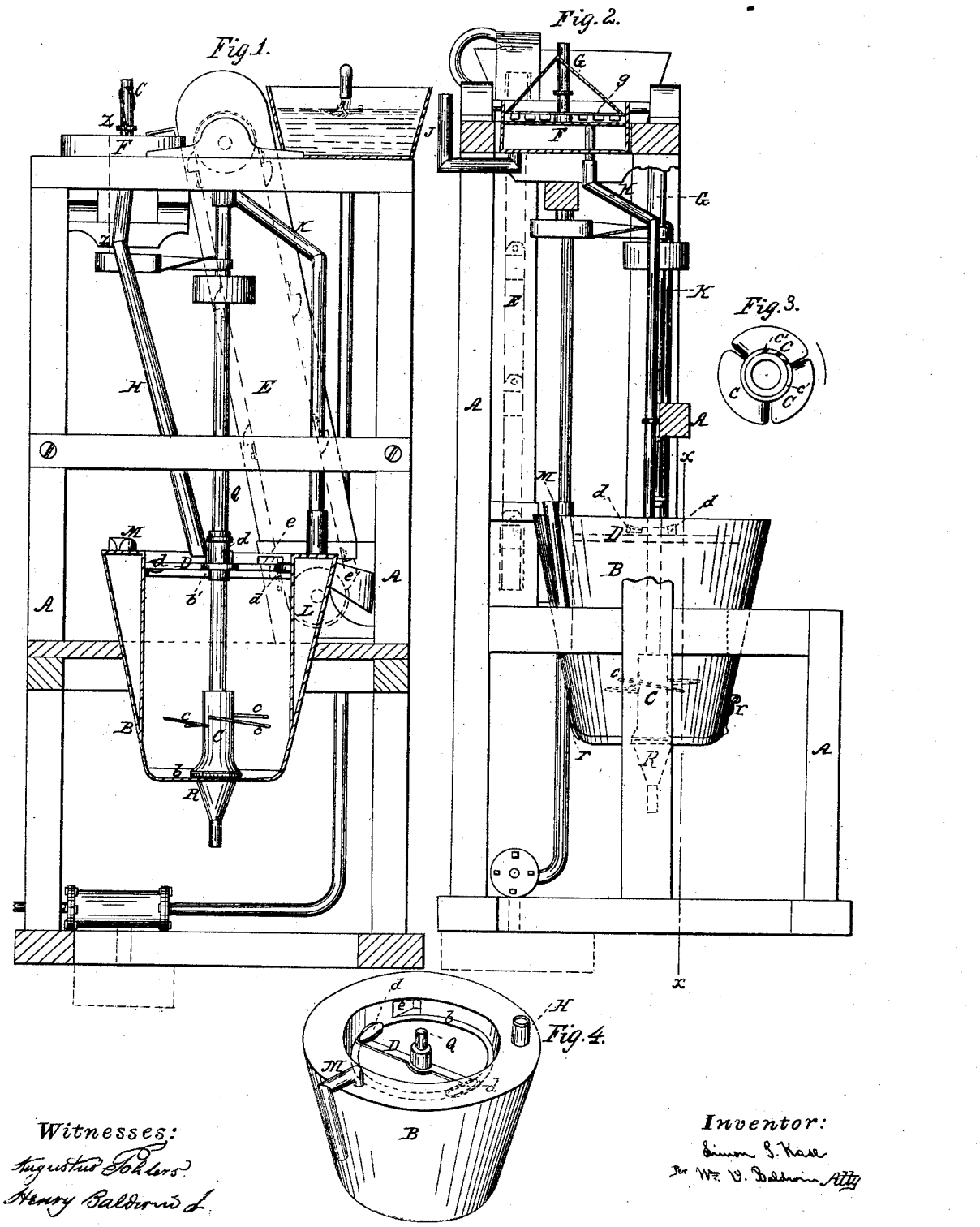

UNITED STATES PATENT OFFICE.

SIMON P. KASE, OF DANVILLE, PENNSYLVANIA.

MACHINE FOR CLEANING RICE.

Specification of Letters Patent No. 30,682, dated November 20, 1860.

*To all whom it may concern:*

Be it known that I, SIMON P. KASE, of Danville, in the county of Montour and State of Pennsylvania, have invented certain new and useful Improvements in Machinery for Cleaning Rice, of which the following is a full, clear, and exact description, reference being had to the accompanying drawings, which make part of this specification, and in which—

Figure 1, represents a view, in elevation, of a machine for cleaning rice, embracing my improvements, as seen by a person in front thereof and facing the machine; the pot which contains the rice to be cleaned, and a portion of the framework being shown in section at the line $x$, $x$, of Fig. 2. Fig. 2, represents a similar view of the same, as seen from one side, with a portion of the framework broken away to show the mechanism more clearly; the cooling-tub being shown in section at the line $z$, $z$, of Fig. 1. Fig. 3, represents a similar view of the bottom of the bell-shaped hub which carries the stirrers, and Fig. 4, represents a view, in perspective of the pot and a portion of the mechanism therein contained; showing more particularly the flange or rim on the interior of the pot, the scoops which traverse thereon, and the discharge opening through which the grain passes to the elevator.

Owing to the numerous coatings with which the kernal of rice is protected, and to the different mode of treatment consequently required for the removal of each coat, its proper preparation for the market has heretofore been attended with unnecessary expense and loss of time. Experience has demonstrated that the best way to remove the inner covering of the rice is by the attrition or abrasion of the grains one against another; and this method therefore is now almost universally employed for this purpose. This process, however, is liable to one very serious objection; namely that the rice becomes so much heated by the friction generated by the rapid movement of its particles as to become brittle, and crack or fly to pieces; thus causing not only a great waste of the particles carried off with the chaff, but such an injury to the rice itself as to render it almost unmerchantable; or, at least greatly to diminish its market value.

My invention relates to that class of machines in which the rice is cleaned by the attrition of its grains one upon the other; and my improvements consist, first, in causing a stream of cold water to circulate around the pot or vessel in which the rice is being cleaned; whereby the pot is kept cool and the consequent cracking of the rice prevented; secondly, in making the hub upon which the stirrers are mounted of a bell-mouth or trumpet shape; and causing its lower end to revolve in close proximity to the bottom of the pot; whereby the crowding of the grains under the hub and their consequent crushing is prevented; thirdly, in forming a series of tangential grooves in the bottom of the hub in such manner that they shall incline in a direction contrary to that of the rotation of the hub, and serve (while effectually excluding the rice) as channels for the admission of air to the rice; whereby I am enabled to introduce a stream of air into the very center of the mass in a manner, in my opinion, much superior to any device heretofore employed for this purpose; fourthly, in combining with the circulation of a stream of cold water around the pot, the admission of a stream of air directly into the mass of grain; whereby its cooling is facilitated; fifthly, in the combination of an elevating, a stirring, and a cooling mechanism with a rice-cleaning machine; sixthly, in the combination of one or more revolving scoops on the stirrer-shaft with a flange on the inside of the pot for the purpose of delivering the rice to the elevator.

To carry out the objects of my invention I construct a strong, rigid frame (of suitable form, dimension, and material) and mount therein a suitable pot or vessel to contain the charge of rice to be cleaned. The sides of this pot are double (in order to form a space through which cold water may circulate) but its bottom is single and hinged so as to open freely, when required to empty the pot. A vertical shaft (supported in suitable bearings in the frame), rotates in the center of the pot, and carries on its lower end a small propeller-wheel or stirrer to act upon the rice. The vanes of the stirrer are secured upon a hub the bottom of which is trumpet-shaped or bell-mouthed and rotates in contact with the smooth bottom of the pot. The bottom of the hub is provided with a series of slots or grooves radiating tangentially from its center and inclined in a direction the reverse of that in which the hub rotates. A hole is formed in the bottom of the pot (directly under the hub) through which hole air may be forced by a fan or bellows and escape, through the tangential openings in the hub, into the pot. One or more revolving arms are mounted on the stirrer-shaft near the top of the pot, and are connected to the shaft by a clutch or feather, to permit them to be thrown into or out of gear at pleasure; they carry (on their outer ends) scoops which traverse upon a flange inside of, and near the top of the pot and sweep the rice which accumulates thereon into an inclined chute, which leads to an elevator mounted upon the frame.

A cooling-tub provided with a double bottom through which cold water may circulate, is placed upon the upper part of the frame (or on a conveniently arranged platform) and provided with a stirrer which spreads and cools the grain as it is delivered to it from the elevator. A pipe or trough which passes through the bottom of the tub, conducts the grain back to the pot after it has been sufficiently cooled. A reservoir may be provided to afford a sufficient supply of water; and, if necessary, its circulation through the pipes, cooling tub, and pot may be maintained by means of a force-pump. The stirrer-shaft, elevator, and other parts of the mechanism may derive their movements from any suitable prime-mover; or, they may be driven by any suitable arrangement of gearing.

The accompanying drawings represent a machine embracing all my improvements, together with a convenient arrangement of parts for carrying out the objects of my invention; but it is obvious that a part only of them may be used with great advantage.

The machinery is mounted in a frame (A) of a size and form commensurate with the purpose to be attained. A pot (B) of suitable form and dimension is strongly imbedded in the lower portion of the framework. The walls or sides of this pot are made double so as to leave a channel or water-space (L) between them. The bottom (b) of the pot is separate from the sides, and connected thereto by a hinge (r) at one side thereof, and held up by a catch (r'), or other suitable fastening. A nozzle (R) is inserted into the center of the hinged bottom (b) for the purpose of admitting a stream of air to the bottom of the pot. A vertical shaft (Q), mounted in suitable bearings in the framework, rotates in the center of the pot. To the lower end of this shaft a hub (C) is attached; upon which hub are placed a series of curved blades or stirrers (c) similar in general appearance to those of a propeller-wheel. These blades act upon the rice in their rotation. The lower end of the hub (C) is trumpet-shaped and rotates in close proximity to the bottom of the pot. A series of shallow tangential grooves (c') are cut in the bottom of the hub, through which groves air may be forced into the pot. These grooves are inclined in a direction the reverse of that in which the hub rotates, as shown in Fig. 3, the arrow indicating the direction in which the hub turns.

A flange (b') encircles the inner side of the pot near its top. Cross-arms (D) are mounted upon the stirrer-shaft (Q), near the level of this flange and carry on their ends scoops (d) which slide along the flange and collect the grain lying thereon. These arms are connected with the shaft by a sliding-clutch (d') and may be thrown into or out of gear at pleasure. An opening (e) is made in one side of the pot just above the flange and leads to an inclined spout or trough (e'), connected at one end with this opening in the pot and at the other with an elevator (E). By this arrangement the grain is swept by the scoops into the opening and conducted into the elevator.

A cooling-tub (F) may be placed upon the top of the frame and provided with a double bottom to permit a stream of water to flow through it. A vertical shaft (G) projects through the bottom of this tub and carries a "hopper-boy" or spreader (g), consisting of a horizontal bar to the under side of which a series of inclined boards are secured in such manner as gradually to sweep the grain around, drawing it at the same time from the circumference toward the center of the tub. A pipe (H) extends through the bottom of the tub and serves to conduct the rice to the pot again. If a running stream cannot be procured a reservoir may be mounted upon the frame and the circulation maintained by a force-pump. If thought preferable a coil of pipes surrounding the pot may be substituted for the water-space (L).

A detailed description of the other parts of the mechanism is deemed unnecessary here, as their construction and mode of operation are well known to all skillful constructors of rice-cleaning machinery; and, besides, they form no part of the subject-matter herein claimed.

The operation of the machine is as follows: The rice, or other grain to be cleaned (after having had its outer hull, first, removed by any suitable means, is placed in the pot (B) which may be filled nearly to the cross-arms (D). Rotary motion is communicated to the stirrer-shaft (Q) in any suitable manner; the cross-arms (D) having first been thrown out of gear. The blades (C) in their rotation crowd the grain down toward the bottom of the pot, causing them to rub against and roll over each other in almost every imaginable direction, while mouthed hub (C) prevents any rice from getting under it and becoming crushed. If desired air may be pumped into the mass of grain through the nozzle (R) and grooves (c'). As the blades (c) continue to crowd the grain down it escapes to the sides of the pot and rises to the surface; its place being supplied by that which descends in the center of the pot. The heat generated by the friction incident to this process is so great that, if not counteracted, it would cause the rice to crack and thus greatly to deteriorate in value; but this is prevented by the constant circulation of cold water around the pot through the space (L). If however these measures should prove insufficient to prevent too great an increase of heat, the cross-arms (D) may be thrown into gear with the stirrer-shaft by means of its clutch (d'). The scoops (d) as they rotate now sweep the rice from the flange (b) and carry it around to the opening (e) in the side of the pot and discharge it into the inclined spout (e') which conducts it to the elevator (E) by which it is discharged into the cooling-tub (F) where it is swept around by the hopper-boy (g) until sufficiently cooled, and then discharged into the trough (H) which conducts it to a point over the pot and allows it to fall some distance through the air before again mingling with the mass of grain in the pot. This process of rubbing, elevating, stirring, cooling and returning to the pot may be repeated as often as required. When sufficiently cleaned the rice may be discharged through the bottom of the pot by unloosening the catch (r') and allowing the bottom to swing upon its hinge (r). The cold water enters first between the double-bottom of the cooling-tub (F) from the pipe (J) (leading from the reservoir) from whence it flows through the pipe K into the water-space (L) between the side walls of the pot. After passing around the pot it flows through the waste-pipe (M) into a cistern from whence it may again be forced up to the reservoir. Ice-water may be employed if necessary to produce a sufficient degree of cold; and the velocity of the current may be regulated by placing a stop-cock in the discharge-pipe (M).

It is obvious that the details of the arrangement of the several parts of my invention might be varied in many ways without departing from the spirit of my invention; but a detailed description of such modifications is deemed unnecessary here as they would readily suggest themselves to an intelligent mechanic after seeing my improvements.

My improvements are obviously also well adapted to clean other grains besides rice.

I do not claim broadly forcing a current of air through a mass of rice while being cleaned in the pot, as I am aware that this is not new; but

Having thus fully described the construction and operation of my improved machine for cleaning rice and other grains, what I claim therein as new and desire to secure by Letters Patent, is—

1. The circulation of a stream of cold water around the pot or vessel in which the rice is contained while being cleaned, substantially in the manner and for the purpose described.

2. The bell-mouthed hub (C) when arranged to operate in relation to the bottom of the pot, substantially as set forth.

3. The grooves (c') in the bottom of the hub (C) when arranged and operating as herein described for the purpose set forth.

4. The combination of a stream of water flowing around the pot with a stream of air passing through the grain, substantially as, and for the purpose set forth.

5. The combination of the elevator (E), hopper-boy (g) and cooling-tub (F), when arranged for joint-operation substantially as herein set forth.

6. The combination of the scoops (d) with the flange (b) as herein described.

In testimony whereof I have hereunto subscribed my name.

SIMON P. KASE.

Witnesses:
ROBT. MOORE,
R. B. HULLIHEN.